(12) United States Patent
Fornara et al.

(10) Patent No.: US 10,890,148 B2
(45) Date of Patent: Jan. 12, 2021

(54) FUEL PUMP FOR AN INTERNAL COMBUSTION ENGINE

(71) Applicant: MARELLI EUROPE S.p.A., Corbetta (IT)

(72) Inventors: Stefano Fornara, Modena (IT); Michael Heyn, Sanford, NC (US)

(73) Assignee: MARELLI EUROPE S.p.A., Corbetta (IT)

( * ) Notice: Subject to any disclaimer, the term of this patent is extended or adjusted under 35 U.S.C. 154(b) by 0 days.

(21) Appl. No.: 16/543,742

(22) Filed: Aug. 19, 2019

(65) Prior Publication Data

US 2020/0056571 A1  Feb. 20, 2020

(30) Foreign Application Priority Data

Aug. 20, 2018  (IT) ......................... 102018000008132

(51) Int. Cl.
| | | |
|---|---|---|
| *F02M 55/00* | (2006.01) | |
| *F02M 37/00* | (2006.01) | |
| *F02M 59/46* | (2006.01) | |

(52) U.S. Cl.
CPC ...... *F02M 55/007* (2013.01); *F02M 37/0023* (2013.01); *F02M 59/466* (2013.01)

(58) Field of Classification Search
CPC ..... B60K 2015/03514; F02M 25/0872; F02M 37/0023; F02M 37/007; F02M 37/0088; F02M 37/20; F02M 55/007; F02M 59/466
See application file for complete search history.

(56) References Cited

U.S. PATENT DOCUMENTS

| | | | | |
|---|---|---|---|---|
| 5,544,483 | A * | 8/1996 | Heuer ................... | F01N 3/2033 60/283 |
| 7,980,228 | B2 * | 7/2011 | Peters ................ | F02M 25/0872 123/518 |
| 2006/0042604 | A1 | 3/2006 | Haskew et al. | |
| 2014/0196694 | A1 * | 7/2014 | Euliss .................... | F02M 25/08 123/520 |
| 2016/0039511 | A1 * | 2/2016 | Kadobayashi ......... | B63H 21/38 123/429 |
| 2016/0169147 | A1 * | 6/2016 | Surnilla .............. | F02D 41/3863 123/299 |

FOREIGN PATENT DOCUMENTS

| | | |
|---|---|---|
| DE | 102011011167 A1 | 8/2012 |
| JP | 2010-174684  * | 8/2010 |
| WO | 9605423 A2 | 2/1996 |

OTHER PUBLICATIONS

Search Report for Italian Patent Application No. 201800008132 dated Feb. 19, 2019.

* cited by examiner

*Primary Examiner* — Phutthiwat Wongwian
*Assistant Examiner* — Diem T Tran
(74) *Attorney, Agent, or Firm* — Howard & Howard Attorneys PLLC

(57) ABSTRACT

Fuel pump for an internal combustion engine, wherein the fuel pump has: an auxiliary tank designed to receive a fuel flow from a low-pressure fuel pump; a pumping device drawing the fuel from the auxiliary tank through a suction duct; a Venturi choke arranged along the suction duct; and a degasification duct, which originates in a ceiling of the auxiliary tank and leads to the middle of the Venturi choke.

13 Claims, 11 Drawing Sheets

FUEL PUMP FOR AN INTERNAL COMBUSTION ENGINE

CROSS-REFERENCE TO RELATED APPLICATIONS

This Patent Application claims priority from Italian Patent Application No. 102018000008132 filed on Aug. 20, 2018, the entire disclosure of which is incorporated herein by reference.

TECHNICAL FIELD

The present invention relates to a fuel pump for an internal combustion engine.

The present invention finds advantageous application to a high-pressure fuel pump for a small internal combustion engine powered by gasoline (e.g. intended for driving a lawn mower or a small snowplough), to which the following description will explicitly refer without thereby losing generality.

PRIOR ART

A modern fuel supply system for a small gasoline-powered internal combustion engine includes a main fuel tank from which a low-pressure fuel pump (typically a pulse fuel pump that exploits pressure variations within the engine block due to the reciprocating movement of the piston) draws. The low-pressure fuel pump supplies the fuel from the main tank to a small auxiliary tank coupled to a high-pressure fuel pump, which supplies the pressurized fuel to the injector (or to the injectors in the case of a multi-cylinder internal combustion engine). Generally, the fuel injection is of the PFI ("Port Fuel Injection") type and therefore the fuel is injected into the suction duct (therefore upstream of the suction valves) close to the suction valves.

The auxiliary tank coupled to the high-pressure fuel pump comprises a degasification duct, which originates in the ceiling of the auxiliary tank (namely through an upper wall of the auxiliary tank) and ends in a suction duct of the internal combustion engine. In use, the depression generated in the suction duct draws the fuel vapours into the auxiliary tank through the degasification duct, thus avoiding an excessive accumulation of fuel vapours in the auxiliary tank and consequently avoiding the onset of the so-called vapour lock, which can cause a (more or less temporary) blockage of the high-pressure fuel pump. At the inlet of the degasification duct there is a roll-over shut-off valve that seals the degasification duct in the event of the vehicle overturning. This avoids any fuel leakage through the degasification duct in the event of the vehicle overturning, consequently reducing any risk of fire.

The auxiliary tank coupled to the high-pressure fuel pump comprises an overflow valve (typically a needle valve controlled by a float), which closes the fuel inlet to the auxiliary tank once a predetermined maximum level has been reached. This means that the overflow valve closes the fuel inlet to the auxiliary tank to prevent any overfilling of the auxiliary tank. In fact, if the auxiliary tank were overfilled, the excess fuel could be sucked along the degasification duct arriving directly in the suction duct.

Patent applications WO9605423A1, US2006042604A1 and DE102011011167A1 describe some examples of high-pressure fuel pumps for an internal combustion engine.

DESCRIPTION OF THE INVENTION

The object of the present invention is to provide a fuel pump for an internal combustion engine, said fuel pump being easy and inexpensive to manufacture.

The present invention therefore provides a fuel pump for an internal combustion engine as claimed by the appended claims.

The claims describe preferred embodiments of the present invention forming an integral part of the present description.

BRIEF DESCRIPTION OF THE DRAWINGS

The present invention will now be described with reference to the annexed drawings showing a non-limiting embodiment, in which.

PREFERRED EMBODIMENTS OF THE INVENTION

Figure 1:
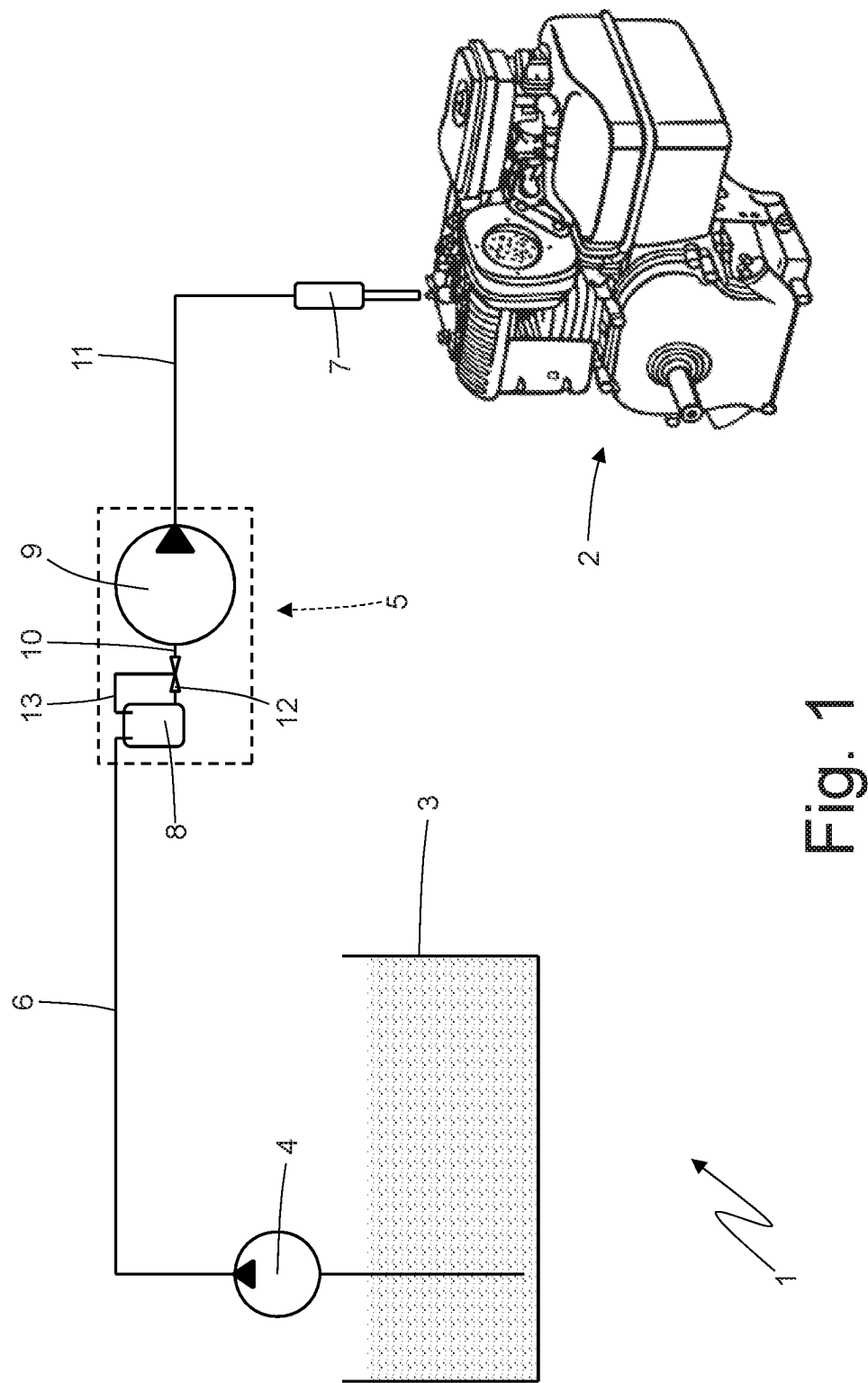
FIG. 1 is a schematic view of a fuel supply system in a small internal combustion engine.

In FIG. 1, the number 1 indicates as a whole a fuel supply system for a small internal combustion engine 2.

The fuel supply system 1 comprises a main tank 3, which contains the fuel of the internal combustion engine 2 and has a capacity of at least a few litres. The fuel supply system 1 further comprises a low-pressure fuel pump 4 that draws the fuel from the main tank 3 and supplies it to a high-pressure fuel pump 5 by means of a supply duct 6. For example, the low-pressure fuel pump 4 operates in pulses and uses the pressure variations within an engine block of the internal combustion engine 2 due to the reciprocating movement of the piston (or of the pistons). The high-pressure fuel pump 5 supplies the fuel to (at least) a fuel injector 7 of the internal combustion engine (obviously, in the case of a multi-cylinder internal combustion engine with several fuel injectors 7 receiving the fuel from the high-pressure fuel pump 5). Generally, the fuel injection is of the PFI ("Port Fuel Injection") type and therefore the fuel is injected into a suction duct (then upstream of the suction valves) close to the suction valves.

The high-pressure fuel pump 5 comprises a small auxiliary fuel tank 8 having e.g. a capacity of less than one decilitre of fuel against a capacity of at least a few litres of fuel of the main tank 3. The supply duct 6 ends in the auxiliary tank 8 and therefore the low-pressure fuel pump 4 supplies the fuel directly into the auxiliary tank 8. The high-pressure fuel pump 5 further comprises a pumping device 9, which is preferably electrically driven (i.e. is rotated by a dedicated electric motor), draws the fuel from the auxiliary tank 8 through a suction duct 10 and supplies the pressurized fuel to the fuel injector 7 through a supply duct 11.

Along the suction duct 10 (extending from the auxiliary tank 8 to the pumping device 9) it is provided a Venturi choke 12 (better shown in FIG. 5), namely a progressive and localized reduction of the flowing section of the suction duct 10. The high-pressure fuel pump 5 comprises a degasification duct 13, which originates in the ceiling of the auxiliary tank 8 (namely through an upper wall of the auxiliary tank 8) and ends in the Venturi choke 12 (as better shown in FIG. 5). According to a preferred embodiment shown in the attached figures, the degasification duct 13 has a vertical final section such that the Venturi choke 12 is lower than the auxiliary tank 8.

Figure 2:
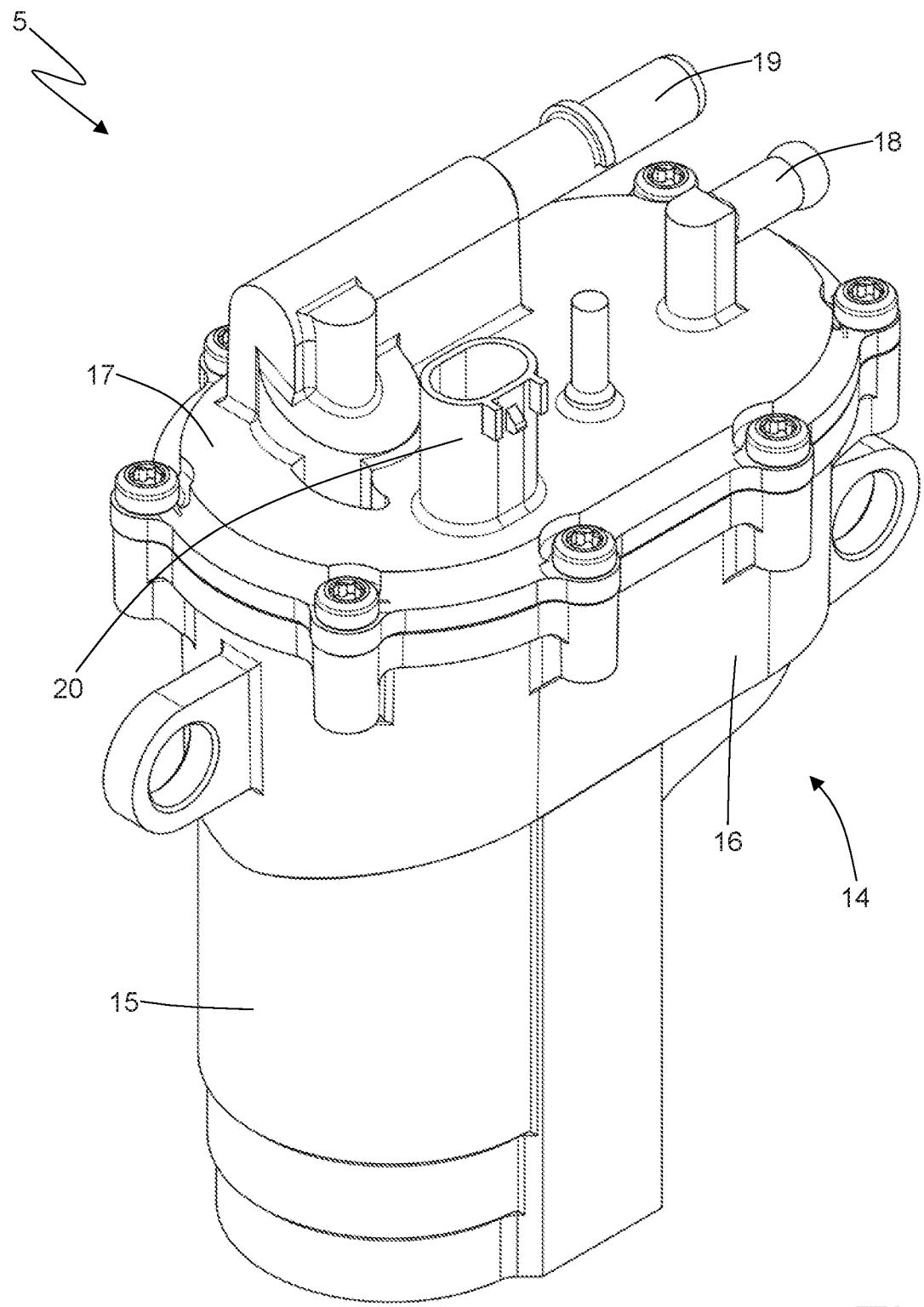
FIG. 2 is a perspective view of a high-pressure fuel pump of the fuel supply system of FIG. 1.

FIG. 2 shows in a perspective view a container 14 defining the auxiliary tank 8 and housing the pumping device 9, the suction duct 10 (provided with the Venturi choke 12) and the degasification duct 13. The container 14 has an inverted L-shape formed by a vertical body 15 housing the pumping device 9. The vertical body 15 is provided with a side bulge 16, inside which the auxiliary tank 8 is defined. The container 14 is provided with a screwed lid 17, which delimits the auxiliary tank 8 at the top. A pipe 18 provided through the lid 17 is connected to the supply duct 6 coming from the low-pressure fuel pump 4 and a further pipe 19 provided through the lid 17 is connected to the supply duct 11 directed towards the fuel injector 7. Through the lid 17 it is further provided an electrical outlet 20, electrically supplying the electric motor operating the pumping device 9.

Figure 5:
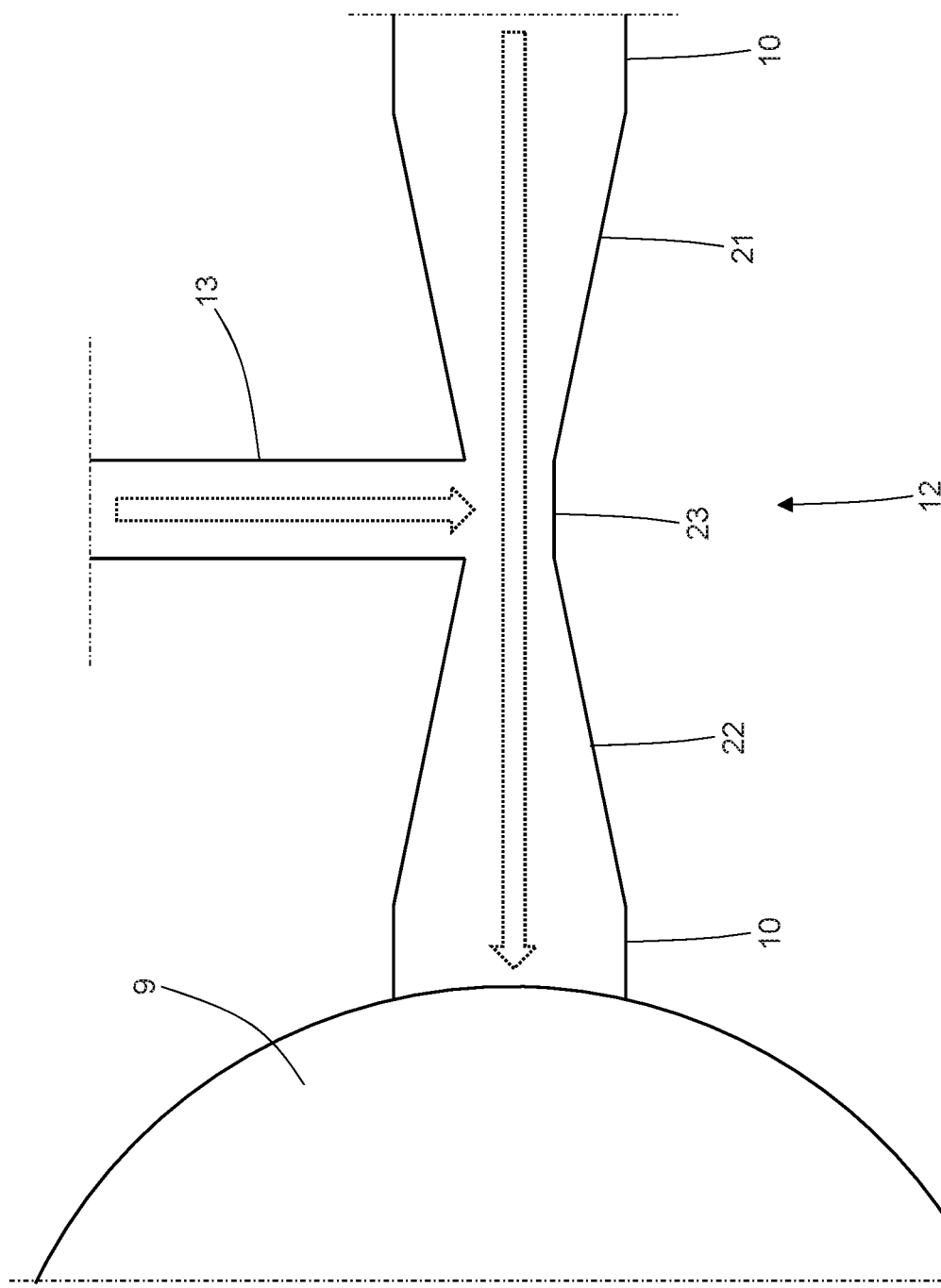
FIG. 5 is a schematic view of a detail of the high-pressure fuel pump of FIG. 2.
Figure 6:
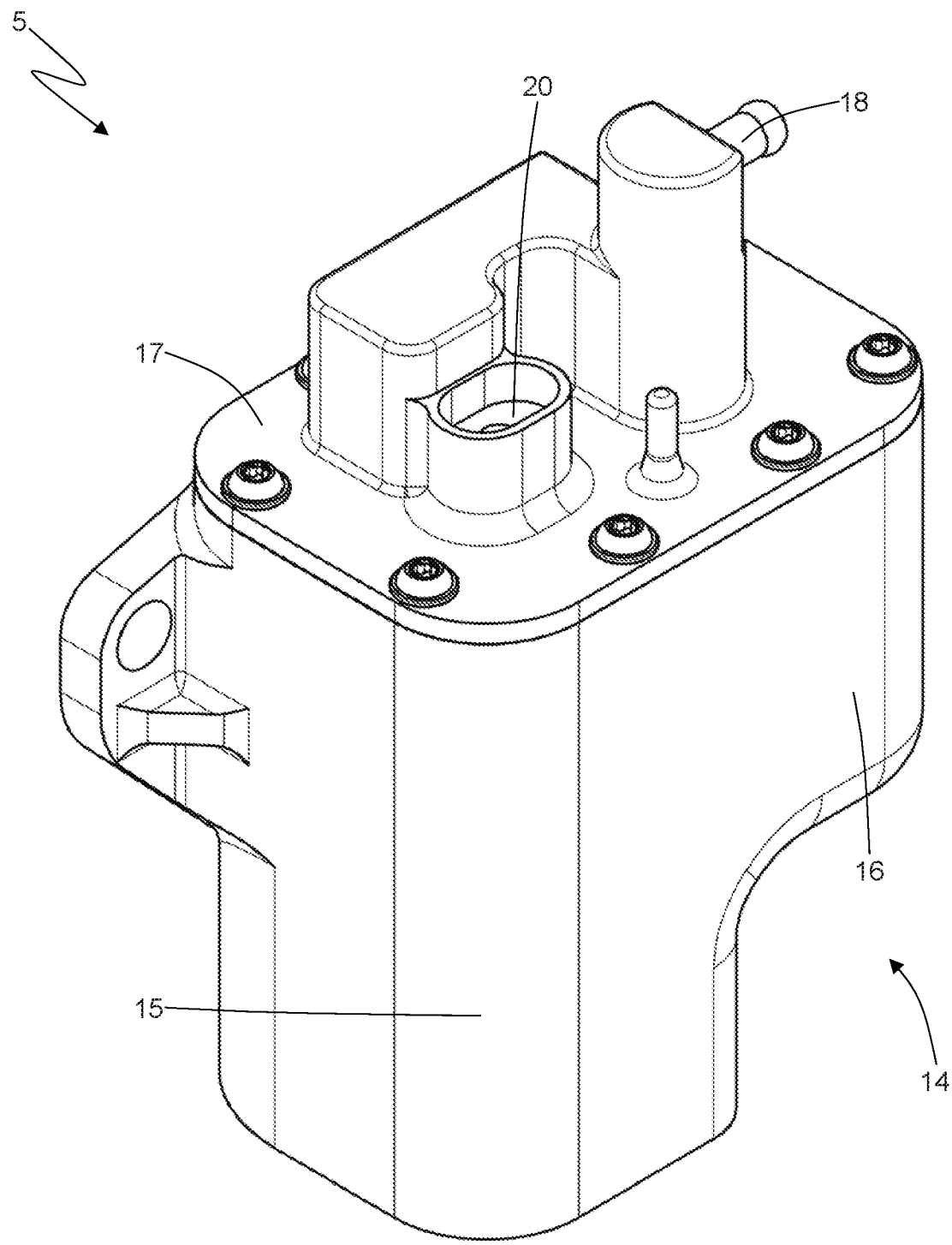
FIG. 6 is a perspective view of a variant of the high-pressure fuel pump of FIG. 2.
Figure 7:
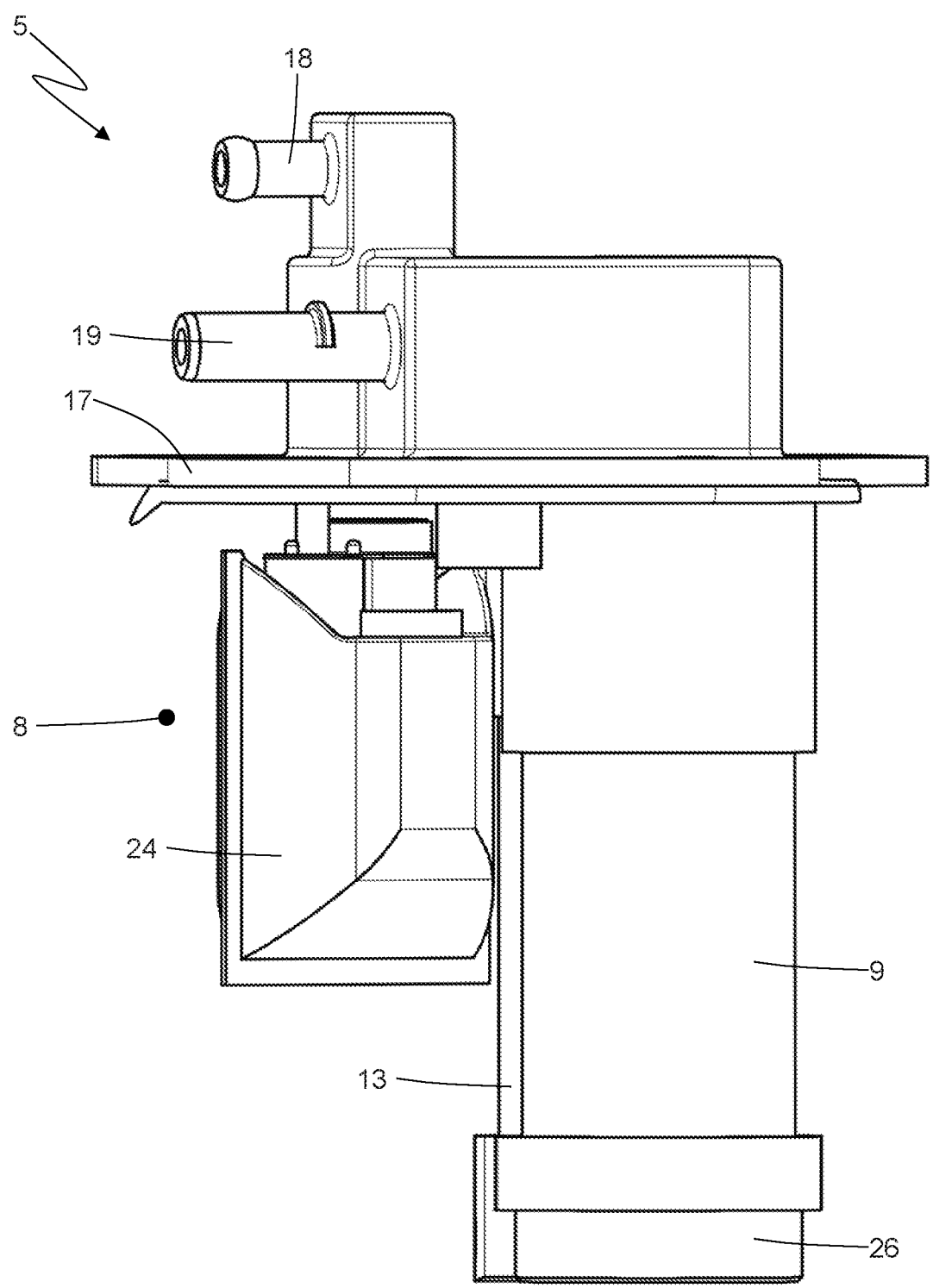
FIGS. 7 and 8 are two different perspective views of the high-pressure fuel pump of FIG. 6 with parts removed for clarity's sake.
Figure 8:
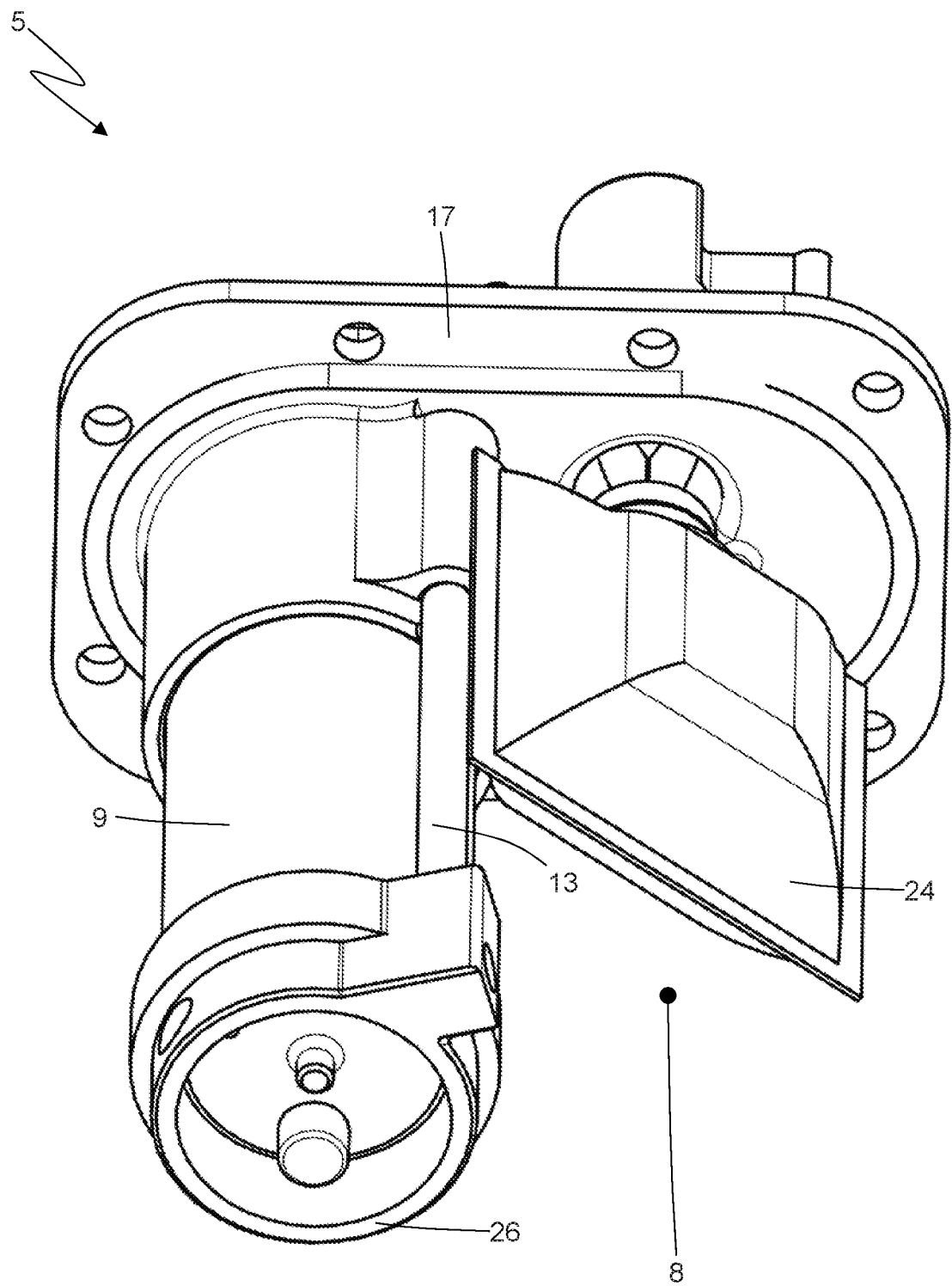
Figure 9:
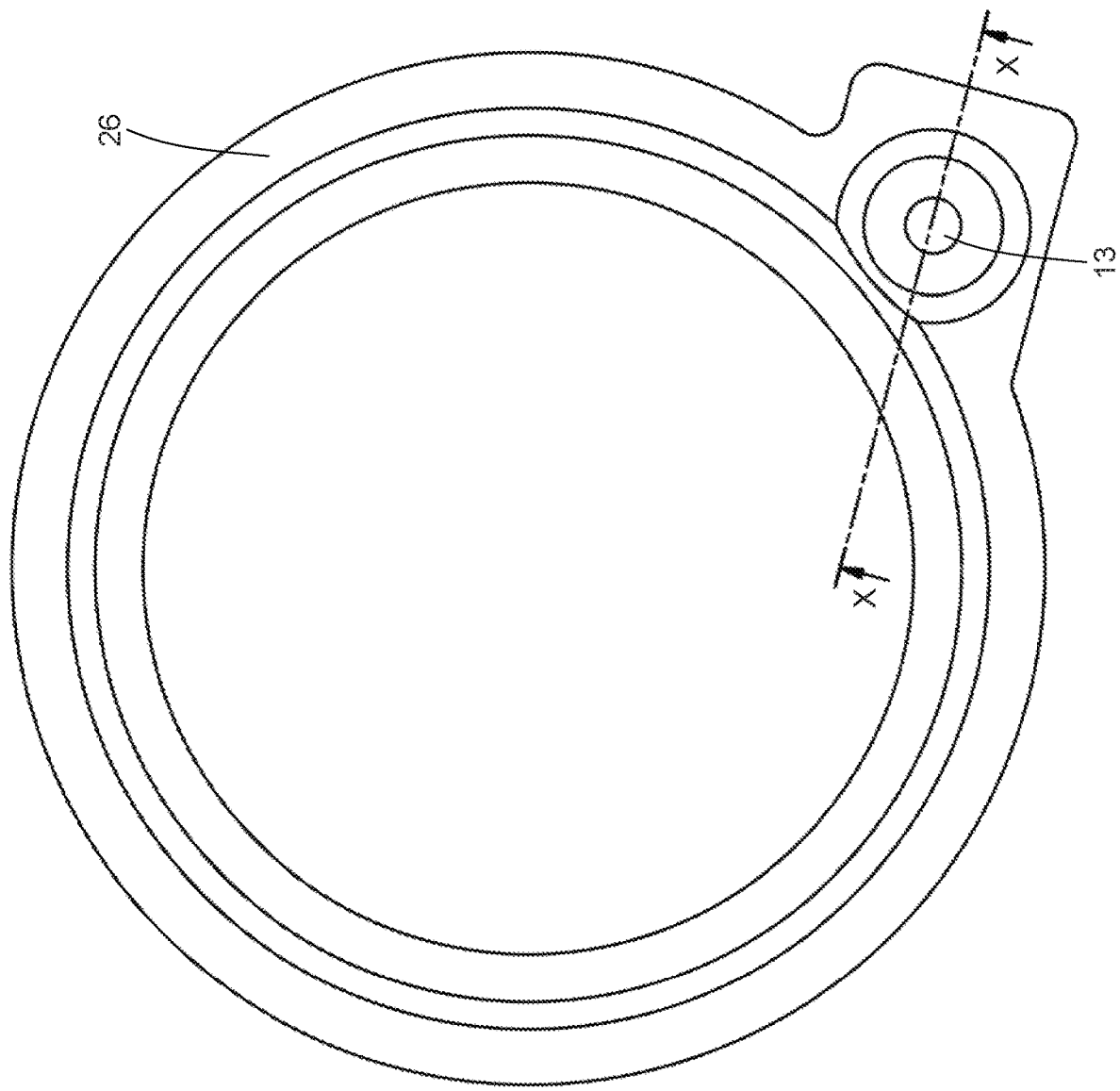
FIG. 9 is a plan view of a component of the high-pressure fuel pump of FIG. 6.
Figure 10:
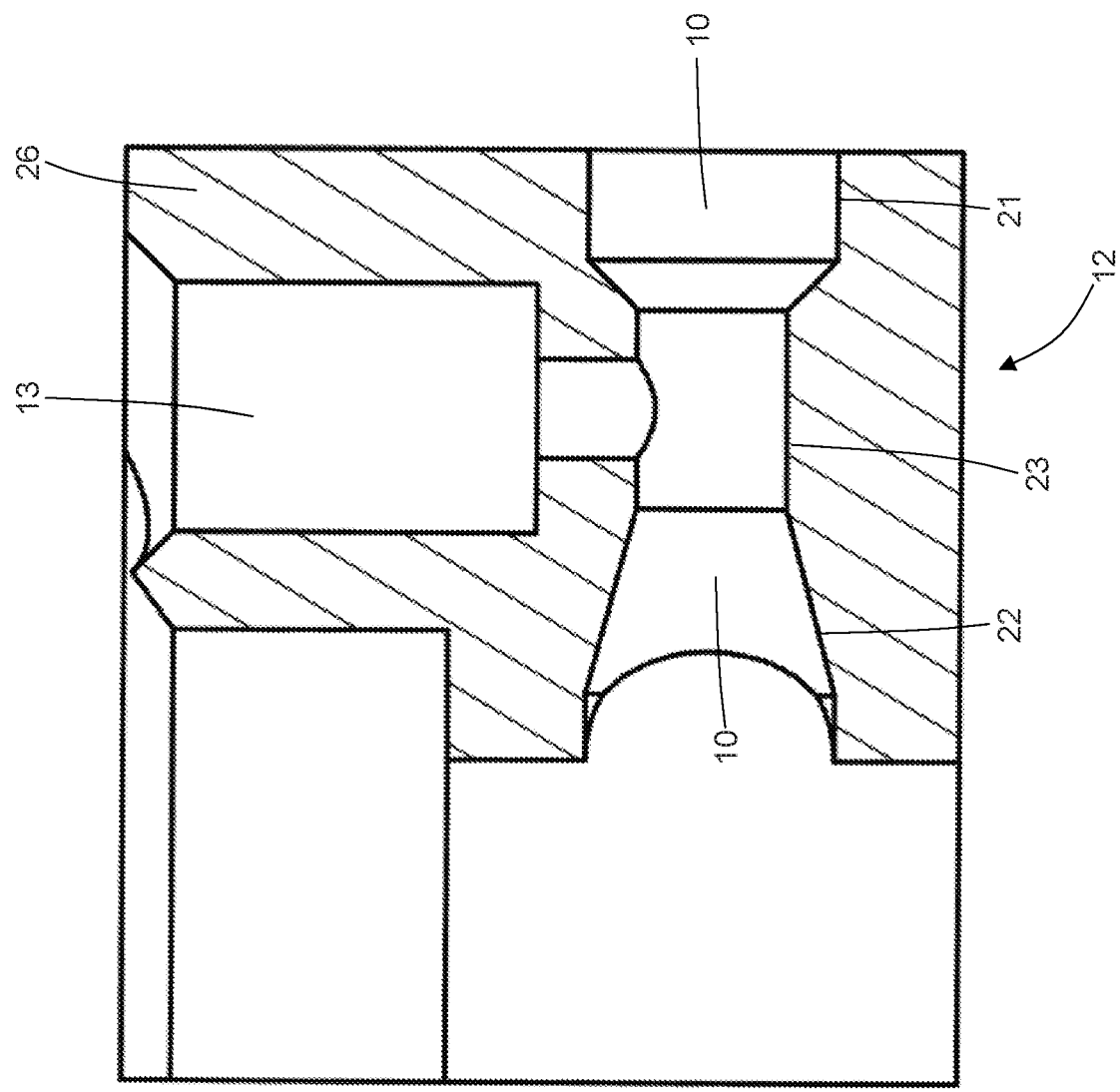
FIG. 10 is a section view along the line X-X of the component of FIG. 9.
Figure 11:
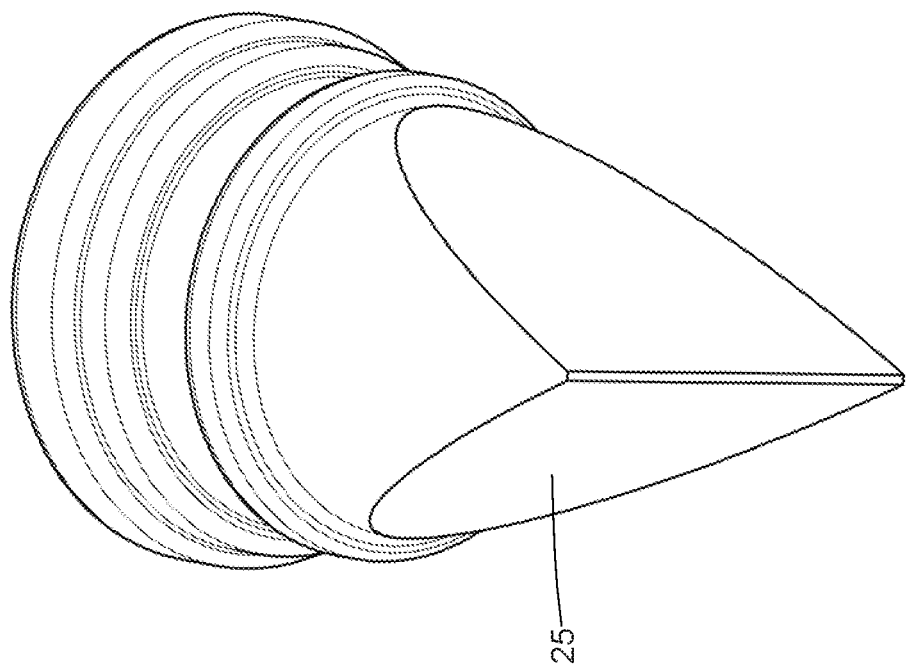
FIG. 11 is a perspective view of a one-way valve of the high-pressure fuel pump of FIG. 6.

As best shown in FIG. 5, the Venturi choke 12 comprises a converging truncated cone-shaped segment 21 in which the flowing section is progressively reduced until it reaches a minimum value in the middle of the Venturi choke 12. Moreover, the Venturi choke 12 comprises a diverging truncated cone-shaped segment 22 in which the flowing section is progressively increased from the minimum value up to the value present upstream (and downstream) of the Venturi choke 12. The degasification duct 13 leads to the middle of the Venturi choke 12, or between the converging segment 21 and the diverging segment 22. In the embodiment shown in FIG. 5, between the converging segment 21 and the diverging segment 22 the Venturi choke 12 further comprises an intermediate segment 23 with a constant section to which the degasification duct 13 leads. According to another embodiment not shown, the intermediate segment 23 is absent and the converging segment 21 directly connects to the diverging section 22.

The operation of the high-pressure fuel pump 5 is described hereinafter.

The low-pressure fuel pump 4 sends the fuel cyclically from the main tank 3 to the auxiliary tank 8, thus keeping the auxiliary tank 8 substantially always full. The low-pressure fuel pump 4 is sized to provide a fuel flow rate at least equal to the maximum possible fuel consumption of the internal combustion engine 2 and therefore the auxiliary tank 8 is substantially always full (when the auxiliary tank 8 is full, the low-pressure fuel pump 4 is not able to feed any additional fuel into the auxiliary tank 8 and then stops).

When the pumping device 9 is in operation, the pumping device 9 draws the fuel from the auxiliary tank 8 through the suction duct 10, pressurizes it and sends it under pressure to the fuel injector 7 through the supply duct 11. The fuel flowing through the suction duct 10 thanks to the action of the pumping device 9 causes in the middle of the Venturi choke 12 a depression due to the known Venturi effect (or hydrodynamic paradox), whereby the pressure of a fluid flow increases when its speed decreases. Substantially, at the Venturi choke 12 the fuel flow speed must necessarily increase and therefore at the Venturi choke 12 the fuel pressure must necessarily decrease, thus determining the onset of a depression. The depression that forms in the middle of the Venturi choke 12 draws (sucks) the fuel vapours located in the upper part of the auxiliary tank 8 through the degasification duct 13 (which originates in the ceiling of the auxiliary tank 8 and flows precisely into the middle of the Venturi choke 12). In other words, the depression formed in the middle of the Venturi choke 12 is used to retrieve (draw, suck) the fuel vapours located in the upper part of the auxiliary tank 8 into the suction duct 10 and through the degasification duct 13.

The fuel vapours formed within the auxiliary tank 8, obviously located in the upper part of the auxiliary tank 8, are "sucked" by the degasification duct 13, which is connected at the bottom to the Venturi choke 12 arranged along the suction duct 10 (immediately upstream of the pumping device 9). Exploiting the fuel speed along the suction duct 10, namely along the Venturi choke 12, a depression created at the outlet of the degasification duct 13 retrieves the fuel vapours located in the upper part of the auxiliary tank 8. The fuel vapours thus sucked through the degasification duct 13 are introduced with the liquid phase fuel inside the pumping device 9, then becoming a solution due to the pressure leaving the pumping device 9.

Thanks to the combined action of the degasification duct 13 and the Venturi choke 12, an excessive accumulation of fuel vapours in the auxiliary tank is avoided as well as the occurrence of the so-called "vapour lock" phenomenon, which can cause a (more or less temporary) blockage of the high-pressure fuel pump 5.

Figure 3:
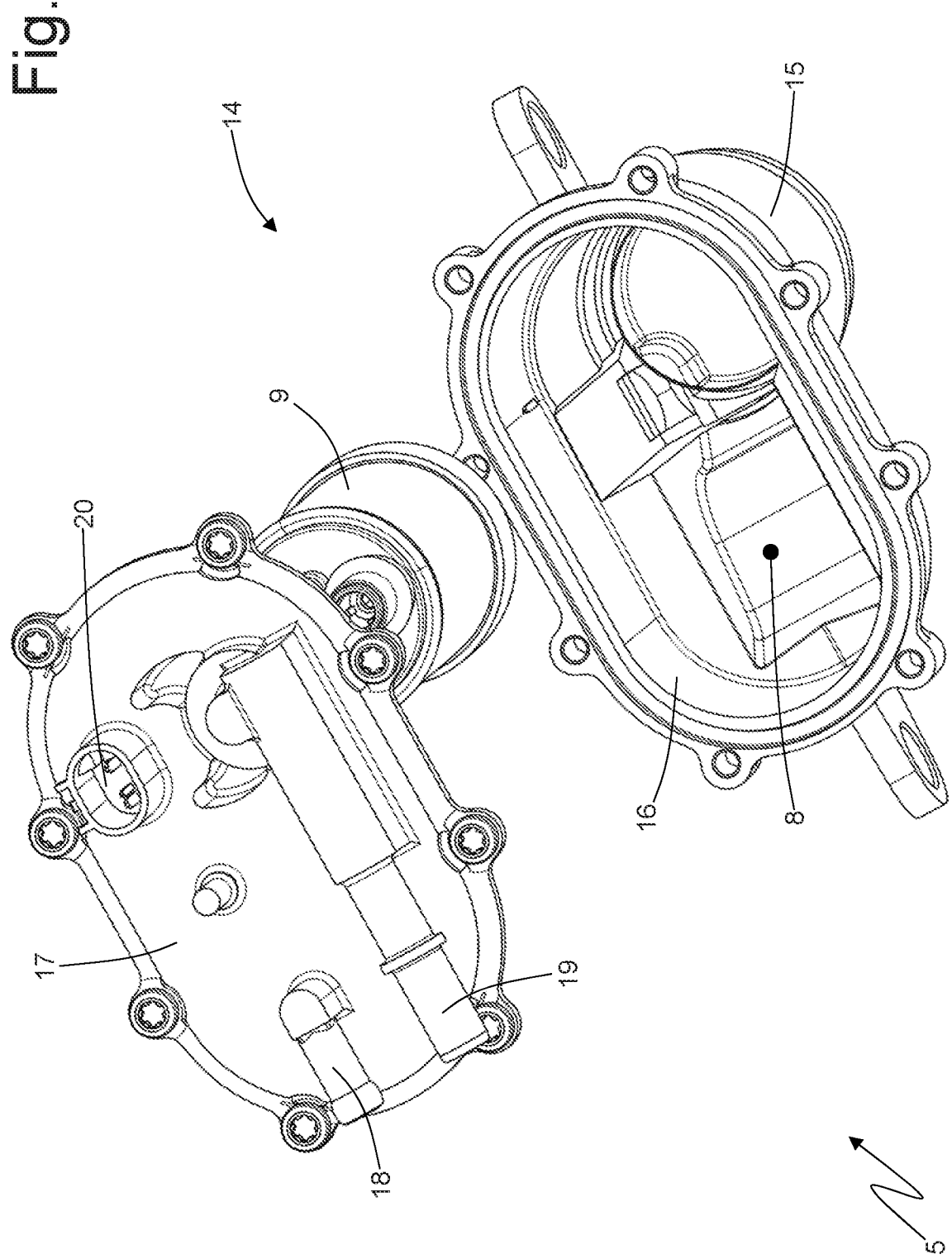
FIG. 3 is a partially exploded perspective view of the high-pressure fuel pump of FIG. 2 with parts removed for clarity's sake.
Figure 4:
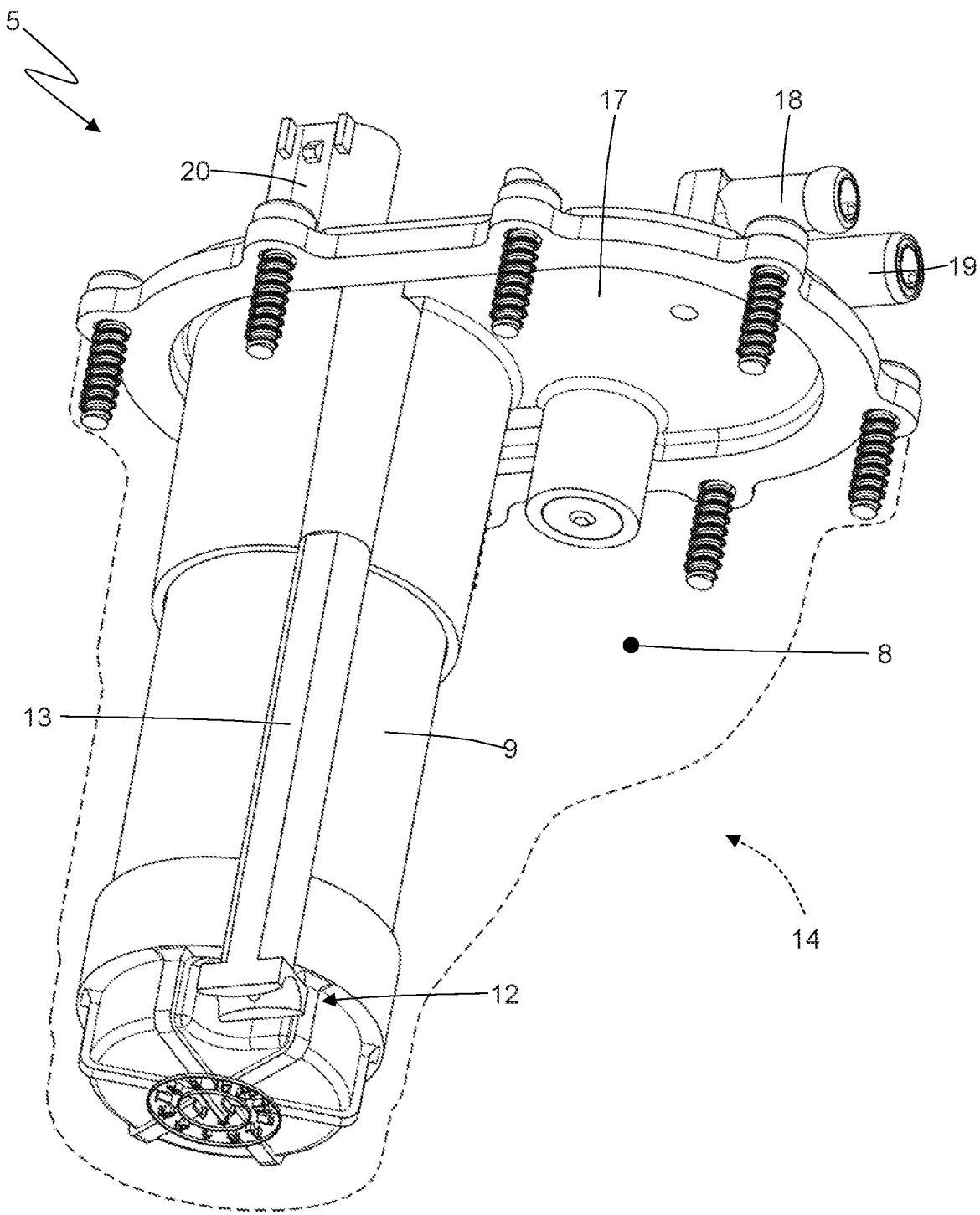
FIG. 4 is a perspective view of the high-pressure fuel pump of FIG. 2 with parts removed for clarity's sake.

FIGS. 6-11 show a different embodiment of the high-pressure fuel pump 5 which, among other things, differs from the high-pressure fuel pump 5 shown in FIGS. 2-4 due to the different shape of some elements. In particular, the high-pressure fuel pump 5 shown in FIGS. 6-11 differs from the high-pressure fuel pump 5 shown in FIGS. 2-4 mainly (but not only) for the different shape of the container 14 and of the lid 17.

The high-pressure fuel pump 5 shown in FIGS. 6-11 differs from the high-pressure fuel pump 5 shown in FIGS. 2-4 due to the presence inside the auxiliary tank 8 of a filter 24 (shown in FIGS. 7 and 8) having the function of retaining any impurities present in the fuel. The filter 24 is directly connected to the pipe 18 that receives the fuel coming from the low-pressure fuel pump 4 through the supply duct 6. Consequently, the filter 24 exerts its filtering action from the inside to the outside, i.e. the fuel coming from the pipe 18 enters the filter 24 and then leaves the filter 24 through a perforated wall of the filter 24. In other words, the filter 24 comprises a bag, which is arranged inside the auxiliary tank 8, is delimited by a perforated wall and into which flows the pipe 18. The function of the filter 24 is to provide an additional barrier against the inlet of foreign bodies in the event that the fuel filter arranged upstream (typically at the fuel inlet inside the main tank 3) be removed by an inexperienced and hasty user. To this regard, it is important to note that the internal combustion engine 2 is small and is normally intended for the implementation of gardening tools or the like and in this scope of use it may happen that an inexperienced and hasty user removes more or less consciously the fuel filter in the main tank 3.

The high-pressure fuel pump 5 shown in FIGS. 6-11 differs from the high-pressure fuel pump 5 shown in FIGS. 2-4 also because of the presence of a one-way valve 25 (shown in FIG. 11), which is arranged immediately upstream of the filter 24 (e.g. inside the pipe 18 or immediately downstream of the pipe 18) and allows a fuel flow only towards the tank 8. According to a preferred embodiment, the valve 25 is made of rubber and ends with a spout having a fuel outlet slit. The function of the one-way valve 25 is to prevent any possible return of fuel from the high-pressure fuel pump 5 to the low-pressure fuel pump 4 from damaging the low-pressure fuel pump 4.

The high-pressure fuel pump 5 shown in FIGS. 6-11 differs from the high-pressure fuel pump 5 shown in FIGS. 2-4 also because of the presence of an annular body 26 (shown in FIGS. 7-10) housing the Venturi choke 12.

The embodiments described herein can be combined with each other without departing from the scope of protection of the present invention.

The high-pressure fuel pump 5 described above has numerous advantages.

In particular, the high-pressure fuel pump 5 described above is particularly simple and inexpensive to manufacture. This result is achieved thanks to the presence of the Venturi choke 12 arranged along the suction duct 10 and of the degasification duct 13 leading to the middle of the Venturi choke 12. In this way, no roll-over shut-off valve is required to seal the degasification duct 13 in the event of the vehicle overturning and no overflow valve is required to close the fuel inlet into the auxiliary tank 8 once a predetermined maximum level has been reached, thus allowing obtaining an evident and substantial saving on production costs. In fact, even if fuel were sucked through the degasification duct 13 there would be no problem, since this fuel sucked through the degasification duct 13 would simply enter the suction duct 10 together with the other fuel directly coming from the auxiliary tank 8 and would be then pumped by the pumping device 9.

LIST OF THE REFERENCE NUMBERS OF THE FIGURES 1 supply system
2 internal combustion engine
3 main tank
4 low-pressure fuel pump
5 high-pressure fuel pump
6 supply duct
7 fuel injector
8 auxiliary tank
9 pumping device
10 suction duct
11 supply duct
12 Venturi choke
13 degasification duct
14 container
15 vertical body
16 side bulge
17 lid
18 pipe
19 pipe
20 electrical outlet
21 converging segment
22 diverging segment
23 intermediate segment
24 filter
25 one-way valve
26 annular body

The invention claimed is:

1. A fuel pump for an internal combustion engine, wherein the fuel pump comprises:
an auxiliary tank, which is designed to receive a fuel flow from a low-pressure fuel pump;
a pumping assembly, which is housed inside the auxiliary tank and draws fuel from the auxiliary tank through a horizontal suction duct that is completely arranged in a lower portion of the auxiliary tank;
a degasification duct, which originates in a ceiling of the auxiliary tank; and at least one horizontal Venturi choke, which is arranged along the horizontal suction duct;
wherein the degasification duct leads to the middle of the Venturi choke;
wherein the Venturi choke comprises a progressive and local reduction of the flowing section of the suction duct and thus is arranged in the lower portion of the auxiliary tank; and
wherein the degasification duct has a vertical end segment leading to the middle of the Venturi choke.

2. The fuel pump according to claim 1, wherein the Venturi choke comprises:
a converging segment with the shape of a truncated cone, where the flowing section is progressively reduced until it reaches a minimum value in the middle of the Venturi choke; and
a diverging segment with the shape of a truncated cone, where the flowing section is progressively increased from the minimum value to the value present upstream and downstream of the Venturi choke.

3. The fuel pump according to claim 2, wherein the Venturi choke comprises an intermediate segment with a constant section, to which the degasification duct leads and which is arranged between the converging segment and the diverging segment.

4. The fuel pump according to claim 1 and comprising a container defining the auxiliary tank and housing the pumping device, the suction duct provided with the Venturi choke and the degasification duct.

5. The fuel pump according to claim 4, wherein the container has an inverted L-shape formed by a vertical body housing the pumping device and is provided with a side bulge, inside which the auxiliary tank is defined.

6. The fuel pump according to claim 5, wherein the container is provided with a screwed lid, which delimits the auxiliary tank at the top.

7. The fuel pump according to claim 6, wherein a first pipe, which is designed to be connected to a first supply duct coming from the low-pressure fuel pump, and a second pipe, which is designed to be connected to a second supply duct directed towards a fuel injector, are arranged through the lid.

8. The fuel pump according to claim 6, wherein an electrical outlet, which supplies power to an electric motor operating the pumping device, is arranged through the lid.

9. The fuel pump according to claim 1 and comprising:
a first pipe to which a first supply duct coming from the low-pressure fuel pump is designed to be connected, and which ends in the auxiliary tank; and
a filter, which is connected to the outlet of the first pipe.

10. The fuel pump according to claim 9, wherein the filter comprises a bag, which is arranged inside the auxiliary tank, is delimited by a perforated wall and into which flows the first pipe.

11. The fuel pump according to claim 1 and comprising:
a first pipe to which a first supply duct coming from the low-pressure fuel pump is designed to be connected, and which ends in the auxiliary tank; and
a one-way valve, which is arranged along the first pipe and allows a fuel flow only towards the auxiliary tank.

12. The fuel pump according to claim 11, wherein the one-way valve is made of rubber and ends with a spout having a fuel outlet slit.

13. The fuel pump according to claim 1 and comprising an annular body having a protuberance which houses the suction duct provided with the Venturi choke.

* * * * *